(12) United States Patent
McCarter et al.

(10) Patent No.: US 10,838,137 B2
(45) Date of Patent: Nov. 17, 2020

(54) LIGHTING DEVICE WITH HIGH EFFICIENCY AND UNIFORMITY

(71) Applicant: VARROC LIGHTING SYSTEMS, s.r.o., Senov u Noveho Jicina (CZ)

(72) Inventors: Glenn McCarter, Ann Arbor, MI (US); Justin F. Lumley, Westland, MI (US)

(73) Assignee: VARROC LIGHTING SYSTEMS, S.R.O., Senov u Noveho Jicina (CZ)

( * ) Notice: Subject to any disclaimer, the term of this patent is extended or adjusted under 35 U.S.C. 154(b) by 0 days.

(21) Appl. No.: 15/689,806

(22) Filed: Aug. 29, 2017

(65) Prior Publication Data

US 2019/0064423 A1 Feb. 28, 2019

(51) Int. Cl.
| | |
|---|---|
| *F21V 8/00* | (2006.01) |
| *F21S 43/14* | (2018.01) |
| *F21S 43/237* | (2018.01) |
| *F21S 43/20* | (2018.01) |
| *F21S 43/249* | (2018.01) |
| *F21S 43/31* | (2018.01) |

(Continued)

(52) U.S. Cl.
CPC ............ *G02B 6/0055* (2013.01); *F21S 43/14* (2018.01); *F21S 43/237* (2018.01); *F21S 43/245* (2018.01); *F21S 43/249* (2018.01); *F21S 43/26* (2018.01); *F21S 43/31* (2018.01); *F21S 43/40* (2018.01); *G02B 6/001* (2013.01); *G02B 6/0038* (2013.01); *G02B 6/0051* (2013.01); *G02B 6/0088* (2013.01); *F21S 41/24* (2018.01); *F21S 43/239* (2018.01)

(58) Field of Classification Search
CPC ............... F21S 48/1241; F21S 48/2243; F21S 48/2268; F21S 43/239; F21S 43/245; F21S 41/24
See application file for complete search history.

(56) References Cited

U.S. PATENT DOCUMENTS

| 7,726,854 B2 | 6/2010 | Bourdin et al. | |
|---|---|---|---|
| 2004/0184286 A1* | 9/2004 | De Lamberterie | B60Q 1/0052 362/559 |

(Continued)

FOREIGN PATENT DOCUMENTS

| CZ | 305608 B6 | 1/2016 |
|---|---|---|
| DE | 19857561 A1 | 6/2000 |

(Continued)

OTHER PUBLICATIONS

German Office Action for Application No. 102018120120.6 dated Jul. 19, 2019; 7 pages.

*Primary Examiner* — Laura A Gudorf
(74) *Attorney, Agent, or Firm* — Cantor Colburn LLP

(57) ABSTRACT

A vehicle lighting device includes an elongated light guide, a reflector, and a volumetric diffuser. The elongated light guide is provided with a non-circular profile that is swept along an elongated spline curve that closely follows a shape of a vehicle's lamp compartment. Light propagates along the length of the light guide by the principal of total internal reflection and is directed towards the diffuser via prismatic optics. The reflector forms a channel around the light guide and redirects scattered light towards the volumetric diffuser. The light guide and reflector together illuminate the volumetric diffuser surface which transmits light into a beam pattern to provide a uniformly lit lighting device.

19 Claims, 7 Drawing Sheets

(51) Int. Cl.
*F21S 43/40* (2018.01)
*F21S 43/245* (2018.01)
*F21S 41/24* (2018.01)
*F21S 43/239* (2018.01)

(56) References Cited

U.S. PATENT DOCUMENTS

| | | | |
|---|---|---|---|
| 2011/0242831 A1 | 10/2011 | Okui et al. | |
| 2013/0201709 A1* | 8/2013 | Natsume | B60Q 1/00 362/511 |
| 2014/0169017 A1* | 6/2014 | Song | B60Q 1/2607 362/511 |
| 2014/0334171 A1 | 11/2014 | Kropac et al. | |
| 2015/0109808 A1* | 4/2015 | Takahashi | F21S 43/237 362/511 |
| 2015/0176790 A1* | 6/2015 | Svettini | F21S 43/00 362/606 |
| 2015/0276162 A1 | 10/2015 | Shibuya | |
| 2017/0350571 A1* | 12/2017 | Gold | F21S 43/14 |

FOREIGN PATENT DOCUMENTS

| | | |
|---|---|---|
| DE | 10129953 A1 | 1/2003 |
| DE | 4129094 B4 | 8/2005 |
| DE | 102008038668 A1 | 2/2010 |
| DE | 102011055429 A1 | 5/2013 |
| EP | 0935091 A1 | 8/1999 |
| EP | 1055867 A3 | 11/2000 |
| EP | 1170545 B1 | 10/2004 |
| EP | 2650600 A1 | 10/2013 |
| JP | 2000003607 A | 1/2000 |

\* cited by examiner

LIGHTING DEVICE WITH HIGH EFFICIENCY AND UNIFORMITY

BACKGROUND

This application related to a lighting device and more particularly a lighting device for a vehicle, and even more particularly a lighting device for a vehicle comprising a light guide.

Lighting devices, particularly for vehicles, have many stringent requirements, particularly concerning lighting efficiency and uniformity, particularly for park, turn signal, running, and signature lamps, which are frequently integrated around specific vehicle features, such as head lamps, tail lamps, or other interior or exterior vehicle features, and often are used as an integral part of the make/model/brand identification and styling for a vehicle.

Recently, these lighting devices, particularly for vehicles, have utilized multiple spaced apart LED lamps. A disadvantage is that the lamp fixtures for these devices may require a mirrored reflector to achieve high efficiency, spread and uniform distribution of light. Also, it is difficult to provide uniform surface area lighting effect across the entire surface of the lamp due to the single point LED light sources. To achieve a uniform light distribution may require multiple textured lens filters or diffusers positioned in front of the LED light source or many additional LED sources with close spacing. This in turn results in light losses and lower lighting efficiency of the associated device.

Accordingly, it is desirable to provide lighting devices, particularly vehicle lighting devices, with high efficiency and uniformity that avoid the problems noted above.

SUMMARY

In one embodiment, a lighting device, such as a vehicle lighting device, is disclosed. The lighting device includes an elongated light guide, a reflector, and a volumetric diffuser. The elongated light guide is provided with a non-circular profile that is swept along an elongated spline curve that closely follows a shape of a vehicle's lamp compartment. The non-circular profile of the elongated light guide lies normal to the spline curve at any point. The light guide's surfaces allow light to propagate along a length of the light guide by the principal of total internal reflection. The elongated light guide is provided with prismatic optics that are arranged to direct light normal to the light guide's exit optic surface into the volumetric diffuser surface that transmits light into a beam pattern. The reflector is at least partially disposed about the elongated light guide and extends along the elongated spline curve. The reflector has a reflective base wall, a reflective first side wall, and a reflective second side wall each extending away from opposite ends of the base wall that together define a reflective channel. The reflective first side wall and the reflective second side wall define a light exit opening opposite the base wall. The volumetric diffuser is disposed over the light exit opening and extends along the elongated spline curve. The reflector and the volumetric diffuser encapsulate the elongated light guide.

In another embodiment, a lighting device, such as a vehicle lighting device, is disclosed. The lighting device includes an elongated light guide extending along an elongated spline curve. The elongated light guide includes an axially extending exit surface portion and an axially extending reflection portion. The reflection portion is configured to reflect an axial light beam radially outwardly through the exit surface portion. The lighting device also includes a reflector enclosing the light guide and a volumetric diffuser that is configured to transmit or diffuse the light beam. The reflector has a reflective base wall and a pair of generally opposed reflective sidewalls extending away from opposite ends of the reflective base wall that together define a reflective channel. The sidewalls defining a light exit opening opposite the base wall. The reflector is enclosed by the volumetric diffuser that is disposed over the light exit opening. The axial light beam is directed outwardly through the light exit opening and the volumetric diffuser. The elongated light guide may include a plurality of elongated light guide portions each having a first end and a second end, and further includes a plurality of light sources. At least one of the plurality of light sources is optically coupled to the first end of the light guide portions.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to FIGS. 1A, 1B-9, where the present disclosure will be described with reference to specific embodiments, without limiting same, a lighting device 10 is disclosed.

Figure 1A:
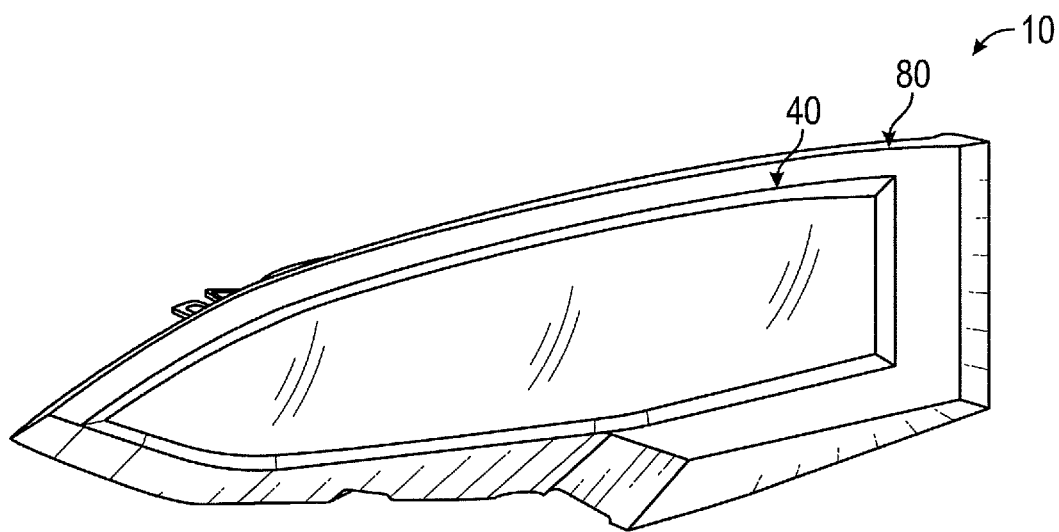
FIG. 1A is a perspective view of an embodiment of a lighting device for a vehicle as disclosed herein.
Figure 1B:
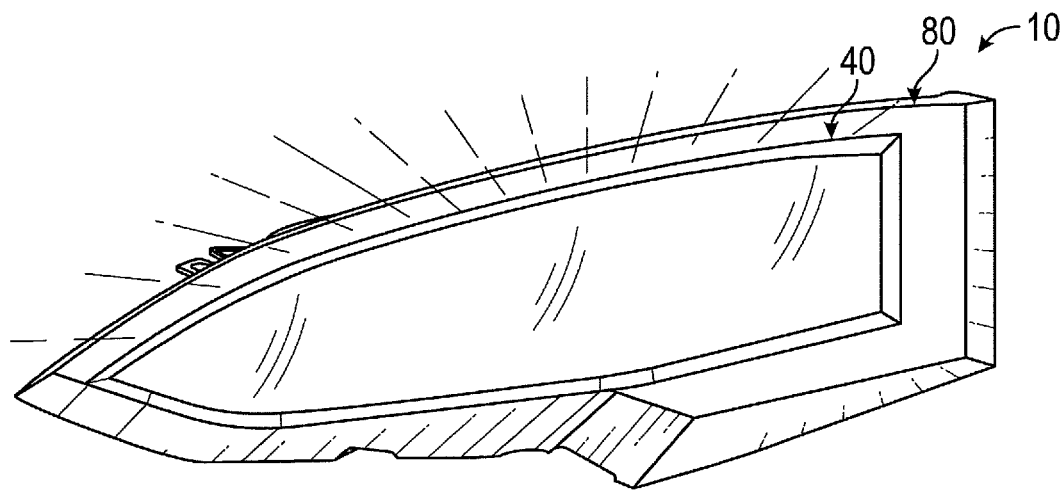
FIG. 1B is a perspective view of an illuminated lighting device of FIG. 1A.

Referring to FIG. 1A, the lighting device 10 may be used in any suitable application, and is particularly well suited for use in vehicle lighting, including lighting for motor vehicles, marine vehicles, airborne vehicle, and the like. The lighting device 10 is particularly well suited for use as an external lamp or decorative lighting for the vehicles mentioned above. In one embodiment, lighting device 10 comprises a motor vehicle headlamp, tail lamp, side lamp, or mirror lamp, or other exterior or interior functional or ornamental lighting. In one embodiment, lighting device 10 is configured to surround or partially surround a vehicle headlamp, and provide a parking lamp, turn signal lamp, running lamp, or signature lamp. As used herein, a signature lamp may comprise lighting other than legally required vehicle lighting that is used to highlight a particular portion or feature of the vehicle. The lighting device 10 of the present disclosure provides a uniform or homogeneous appearance, as shown in FIG. 1B.

Referring to FIGS. 2, 3, 4A, and 4B, the lighting device 10 includes an elongated light guide 20, a reflector 30, and a volumetric diffuser 40.

The elongated light guide 20 may be a free form light guide that extends along an elongated spline curve 22 and has a non-circular profile. The non-circular profile of the elongated light guide 20 is swept along the elongated spline curve 22 such that the non-circular profile lies normal to the elongated spline curve 22 at any point.

The elongated light guide 20 has a length (l) and diameter (d) or thickness (t) for non-circular cross section light guides. The light guide 20 may have any desired length, up to 1 m or more. The light guide 20 may have any desired diameter or size with overall dimensions within the range of 5-12 mm or larger. Small diameter light guides are very advantageous because they allow the size of the other associated components described herein to be reduced. The diameter of the light guide 20 may be fixed or variable and, for example, may vary along the length of the light guide. The light guide 20 may have any desired shape, including various straight or curved shapes.

The light guide 20 includes an axially extending exit surface portion 24 and an axially extending reflection portion 26. The exit surface portion 24 and the reflection portion 26 enable a light beam that is propagated through or along a length of the elongated light guide 20 by the principal of total internal reflection.

Figure 4A:
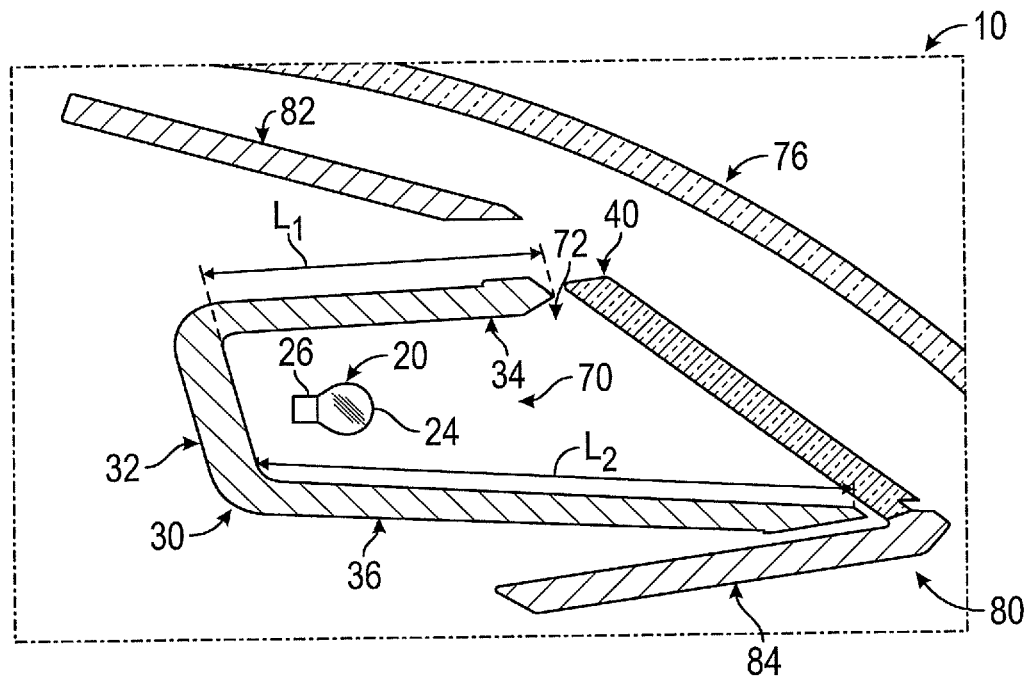
FIGS. 4A and 4B are schematic cross-sectional views of an embodiment of a light guide and housing comprising a bezel and reflector as disclosed herein.
Figure 4B:
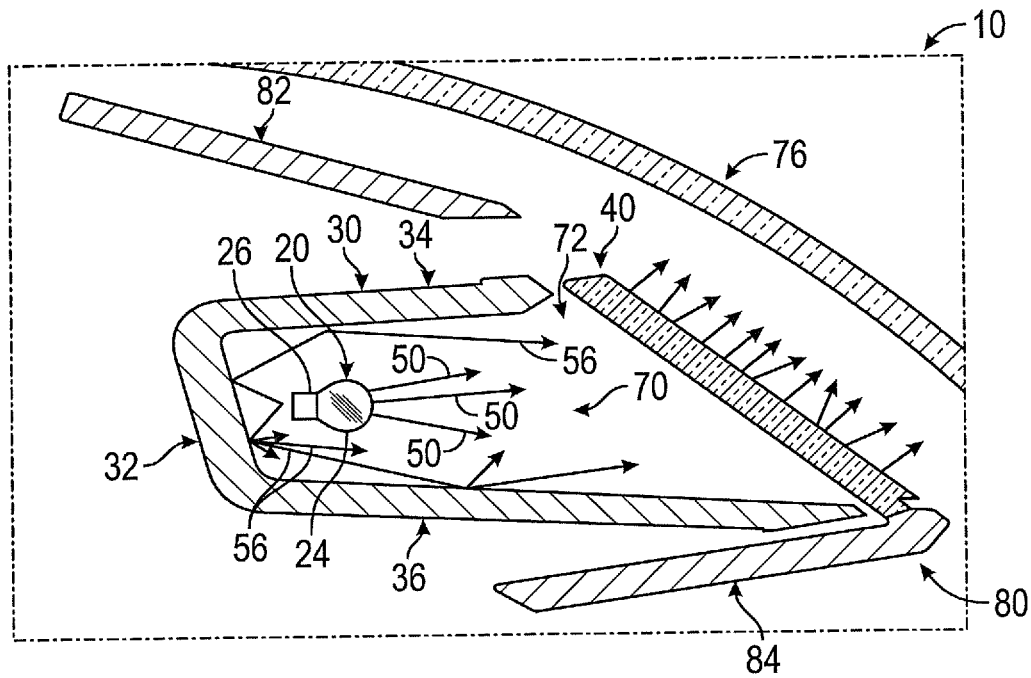
Figure 5:
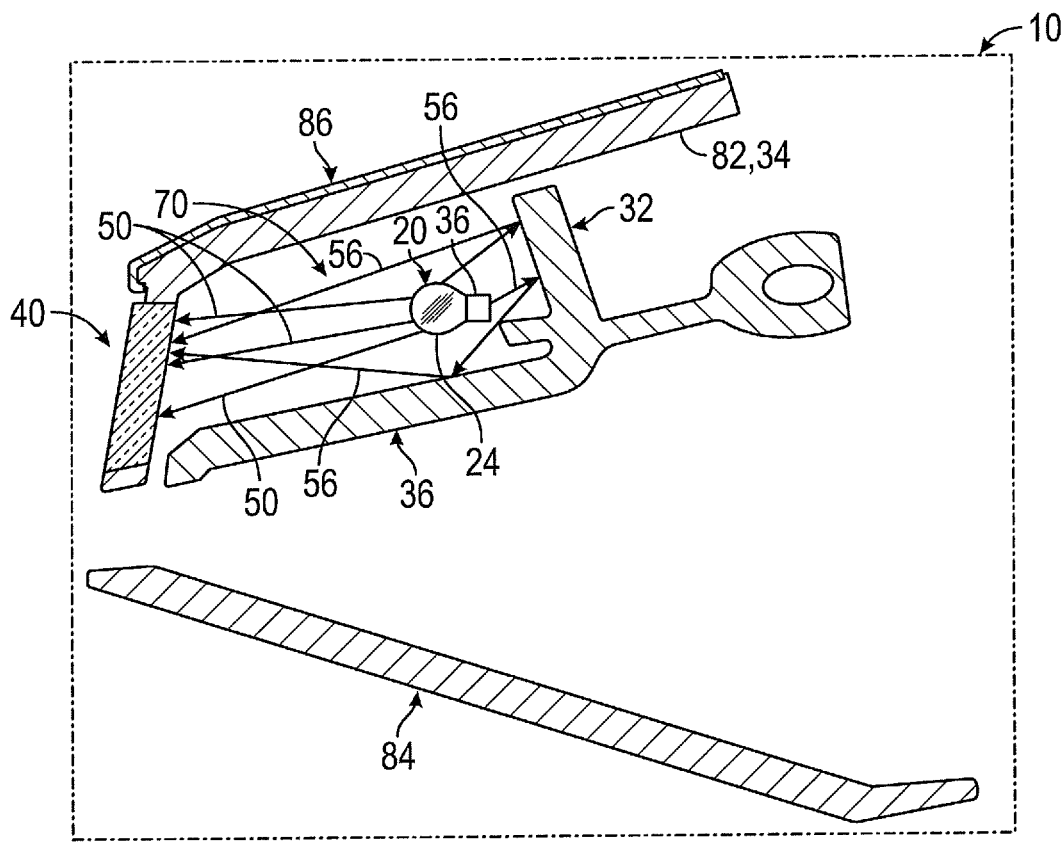
FIG. 5 is a schematic cross-sectional view of an embodiment of a light guide and housing comprising a bezel and reflector as disclosed herein.
Figure 6:
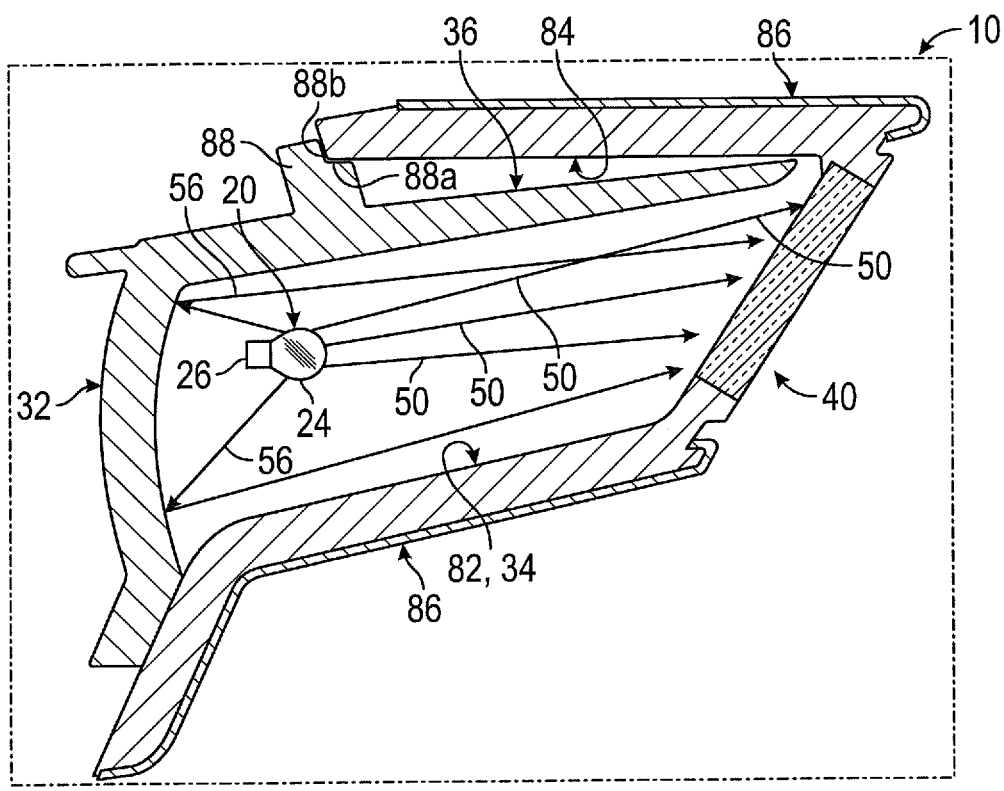
FIG. 6 is a schematic cross-sectional view of an embodiment of a light guide and housing comprising a bezel and reflector as disclosed herein.

The exit surface portion 24 is provided with a non-circular surface profile (when viewed in cross-section, as shown in FIGS. 4-6) that extends along the elongated spline curve 22. The exit surface portion 24 of the light guide 20 faces towards the volumetric diffuser 40. A portion of a light beam that propagates through the light guide 20 may exit through the exit surface portion 24 and be directed towards the volumetric diffuser 40.

The reflection portion 26 extends from the exit surface portion 24 and faces towards a surface of the reflector 30, e.g. the base wall 32. The reflection portion 26 is provided with a plurality of prismatic optics 28 that extend along a length of the reflection portion 26. The plurality of prismatic optics 28 are arranged to direct a portion of the light beam that is normal to the exit surface portion 24 radially outwardly through the exit surface portion 24 and towards the volumetric diffuser 40.

The plurality of prismatic optics 28 includes a plurality of axially-spaced lateral prismatic or prism-like protrusions or teeth, with each tooth having a first facet, f1, and a second facet, f2, extending from the first facet, f1, at a predetermined angle between facets. The teeth may be sized with a desired tooth spacing (s), a desired angle between facets, or a desired pitch or depth (dh) to obtain the desired light distribution, which may include a variable pitch and/or depth, including a pitch and/or depth that vary along the length.

Figure 3:
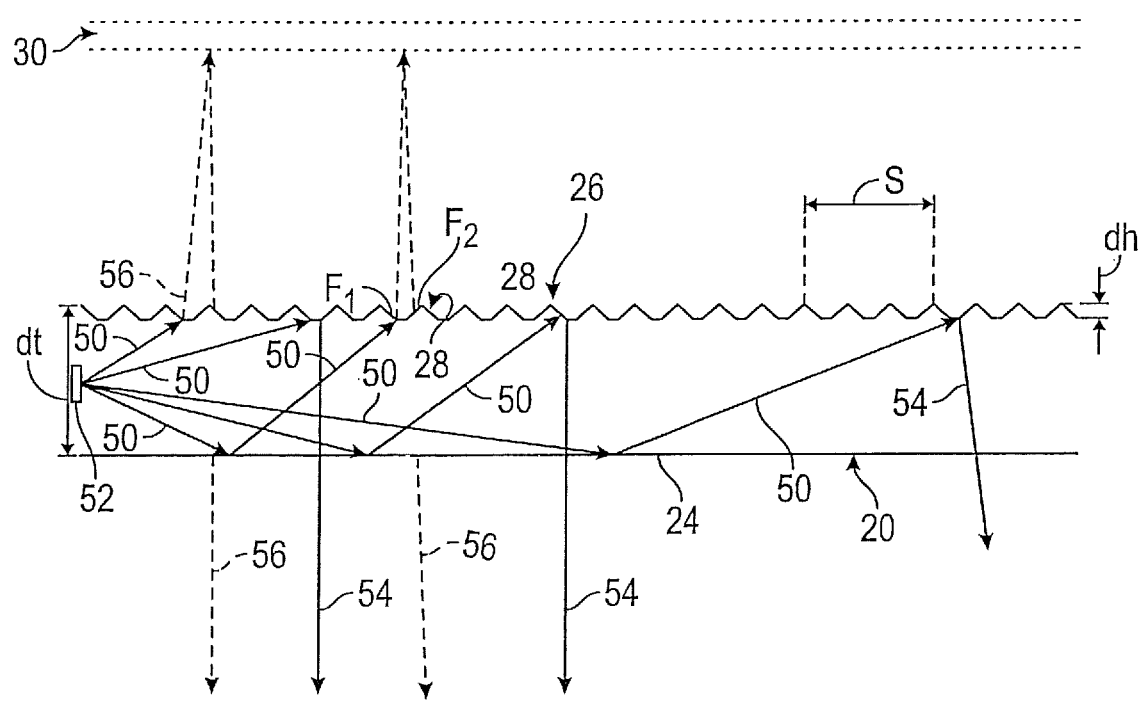
FIG. 3 is a schematic cross-sectional view of an embodiment of a light guide as disclosed herein.

As shown in FIG. 3, a desired angle between facets f1, f2 or the spacing (s) or depth (dh) of the teeth of the plurality of prismatic optics 28 is selected such that light 50 from a light source 52 may be reflected by a facet f1 or f2 of a tooth of the plurality of prismatic optics 28 towards the exit surface portion 24 (e.g. reflected light 54) or exits the light guide 20 and is directed towards a surface of the reflector 30 and reflected past, around, or beyond the elongated light guide 20 (e.g. recycled light 56) such that the light 50, the reflected light 54, and the recycled light 56 are all directed towards the exit surface portion 24. Additionally, a distance (dt) that is measured between the exit surface portion 24 and a tip of the prismatic optics 28 or the reflection portion 26 may be substantially greater than the depth (dh) of the teeth of the prismatic optics 28. The reflector 30 is spaced apart from the elongated light guide 20 at a distance that is approximately double or twice the distance (dt) of the elongated light guide 20.

In at least one embodiment, the reflection portion 26 of the light guide 20 may include a reflective foil that is disposed on the light guide 20 and disposed opposite exit surface portion 24.

The elongated light guide 20 may be made of a material having a refractive index that is selected to work with the exit surface portion 24 and the reflection portion 26 to enable total internal reflectance of (light rays or a light beam) light 50 transmitted into the light guide 20 from the light source 52 with regard to the ambient environment of lighting device 10, such as air or water. The elongated light guide 20 may be made of a material or optical element having a transmissivity of 90% or more, 92% or more, or 95% or more.

The light guide 20 may be made from an optically transmissive material that is configured for total internal reflectance. In at least one embodiment, the elongated light guide 20 is made of an optically transmissive glass or polymer material. The optically transmissive glass or polymer material may be, for example, various silica or silicate, fluorozirconate, fluoroaluminate, and chalcogenide glasses, and various optically transparent polymers, including various silicone, fluoropolymer (e.g. (poly(perfluoro-butenylvinyl ether)), acrylic (PA) and (PMMA), polystyrene (PS), polycarbonate (PC), polyester (PE), polyimide (PI), polyetherimide (PEI), cyclic olefin copolymer (COC), cyclic olefin polymer (COP), and sulfones (e.g. PPSU, PESU, PSU, PES), and including various amorphous polymers.

Referring to FIGS. 4A and 4B-6, the reflector 30 and the volumetric diffuser 40 encapsulate or at least partially surround the light guide 20. The reflector 30 may be generally u-shaped, may be generally c-shaped, or have an optically derived shape (e.g. parabolic shape, elliptical shape, spherically shaped, or free form shaped) when viewed in cross-section, such as in FIGS. 2, 4A, 4B, 5, and 6. The reflector 30 is arranged to reflect, redirect, or recycle the light 50 that escapes the light guide 20 not through the exit surface portion 24, i.e. recycled light 56, back towards the volumetric diffuser 40 for more uniform light collection to provide the lighting device 10 with light having high uniformity with non-directional light distribution.

The reflector 30 is configured to partially surround a vehicle lamp, such as a headlamp. In at least one embodiment, the reflector 30 may have a closed form.

The reflector 30 may be elongated and extends or is swept along the elongated spline curve 22 such that the reflector 30 follows the elongated light guide 20. The reflector 30 may be configured as a white reflector, a silver reflector, a silver/white reflector, or the like. The reflector 30 may be made from any suitable channel material, including various engineering thermoplastic and thermoset polymer materials, and particularly polymer materials that are configured for injection molding. Examples include polypropylene (PP), polyurethane (PUR), poly-vinyl-chloride (PVC), acrylonitrile butadiene styrene (ABS), polyamide (PA), polystyrene (TS), polyethylene (PE), polyoxymethylene (POM), polycarbonate (PC), polybutylene terephthalate (PET), and acrylonitrile styrene acrylate (ASA).

In at least one embodiment, the reflector 30 includes a base wall 32, a first side wall 34 extending from a first end of the base wall 32, and a second side wall 36 extending from a second end of the base wall 32 and is disposed opposite the first side wall 34. The reflector 30 may have any desired size and shape, and will generally advantageously be selected based on the size, including length and diameter, of the light guide 20. As shown in FIGS. 4A and 4B, the reflector 30 is configured as a substantially c-shaped or u-shaped reflective channel.

The first side wall 34 may have a first length, L1, measured between an end of the first side wall 34 and the base wall 32. The second side wall 36 may have a second length, L2, measured between an end of the second side wall 36 and the base wall 32. The first length, L1, is less than the second length, L2 such that an end of the first side wall 34 is disposed closer to the base wall 32 than the second side wall 36, as shown in FIG. 4A.

Figure 2:
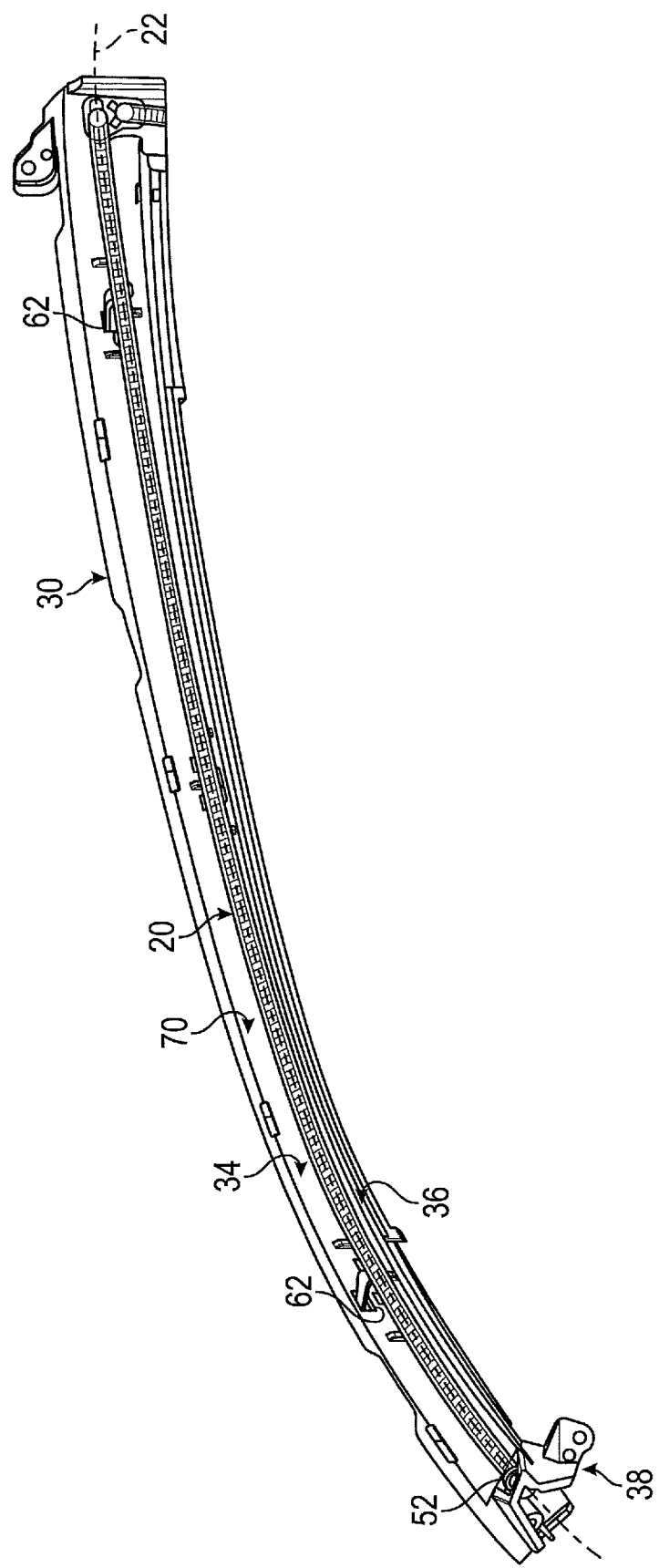
FIG. 2 is a perspective view of an embodiment of a reflector and light guide as disclosed herein.
Figure 9:
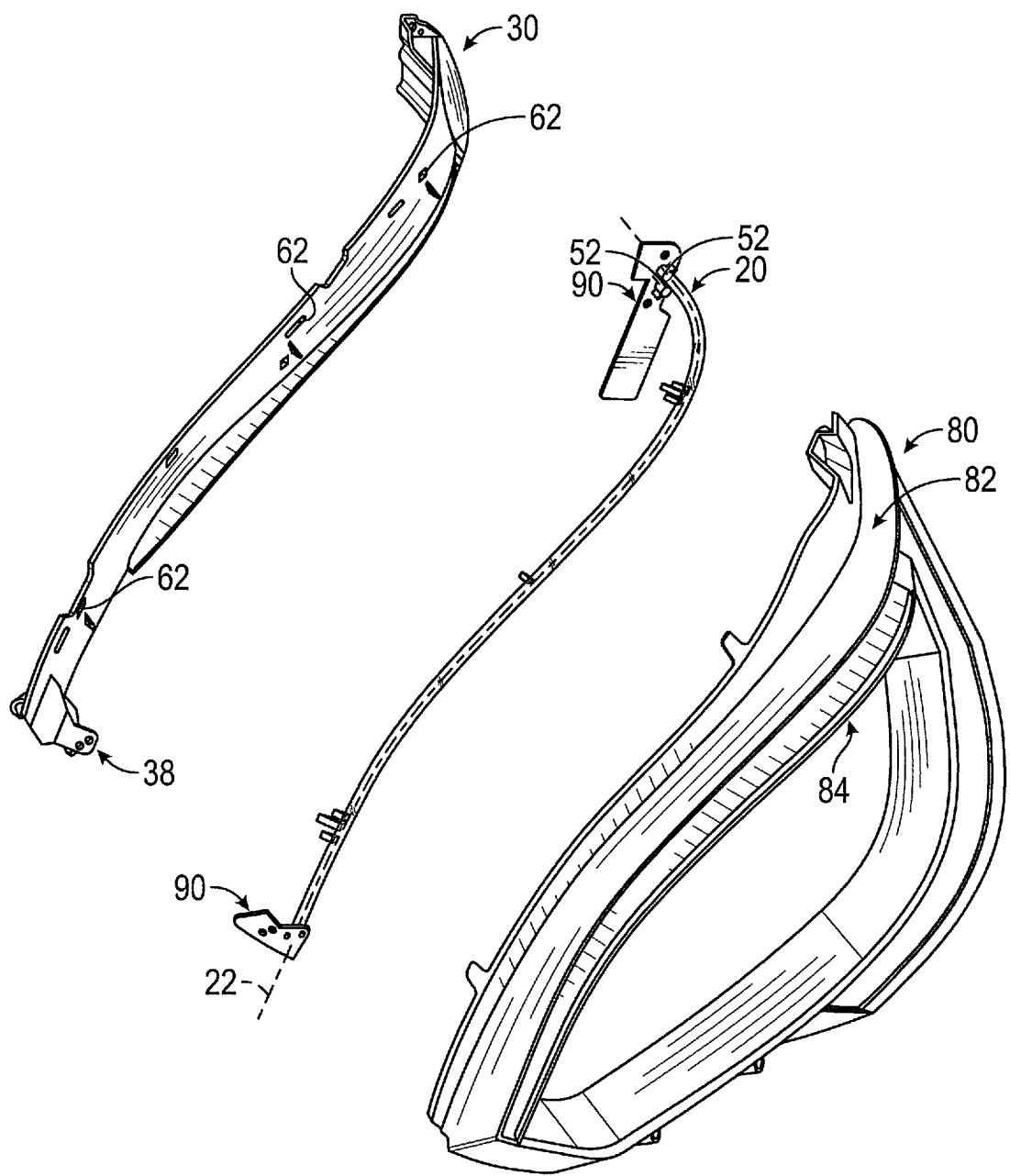
FIG. 9 is an exploded perspective view of a lighting device comprising a bezel, light guide, and reflector as disclosed herein.

An end of the reflector 30 defines a mounting member 38, as shown in FIGS. 2 and 9. The mounting member 38 defines an aperture that is arranged to retain an end of the elongated light guide 20. The mounting member 38 is provided with a flange defining at least one mounting hole that is arranged to connect the reflector 30 to the vehicle structure or other component of the lighting device 10.

The elongated light guide 20 is operatively connected to at least one of the base wall 32, the first side wall 34, and the second side wall 36 of the elongated reflector 30. The elongated light guide 20 or at least one of the base wall 32, the first side wall 34, and the second side wall 36 of the elongated reflector 30 is provided with a connecting member that operatively connects the elongated light guide 20 to at least one of the base wall 32, the first side wall 34, and the second side wall 36 of the elongated reflector 30. The connecting member is spaced apart from an opening 62 that is defined by at least one of the base wall 32, the first side wall 34, and the second side wall 36. The connecting member may be configured as a suspension member, a tab, a track, a clip, a finger, a protrusion, a clamp or other suspension features that are inserted or molded into at least one of the base wall 32, the first side wall 34, and the second side wall 36 of the elongated reflector 30 or into the light guide 20, or both of them.

The base wall 32, the first side wall 34, and the second side wall 36 may be made of a reflective polymer or plastic or may be provided with a reflective coating or reflective foil applied to surfaces of the base wall 32, the first side wall 34, and the second side wall 36 that face toward the light guide 20, such that the base wall 32 is a reflective base wall, the first side wall 34 is a reflective first side wall, and the second side wall 36 is a reflective second side wall. The reflective surfaces of the base wall 32, the first side wall 34, and the second side wall 36 that face toward the light guide 20 define a reflective channel 70. The reflective channel 70 being generally u-shaped. The elongated light guide 20 is at least partially surrounded by the reflective channel 70. The elongated light guide 20 is disposed or suspended within the reflective channel 70. The elongated light guide 20 is suspended within the reflective channel 70. The light guide 20 is positioned closer to the base wall 32 than the volumetric diffuser 40.

As shown in FIGS. 3 and 4B-6, light (e.g. recycled light 56) that escapes or exits the light guide 20 from or through the reflection portion 26 or from a transition region that is disposed between the reflection portion 26 and the exit surface portion 24 of the light guide 20 may reflect against a reflective surface of at least one of the base wall 32, the first side wall 34, and the second side wall 36 and bypass the light guide 20 and the recycled light 56 is directed towards the volumetric diffuser 40.

Ends of the first side wall 34 and the second side wall 36 that are disposed proximate the volumetric diffuser 40 define a light exit opening 72 that is disposed opposite the base wall 32. The reflector 30 is enclosed by the volumetric diffuser 40, such that the volumetric diffuser 40 is disposed over the light exit opening 72 and is spaced apart from at least one of the first side wall 34 and the second side wall 36. In at least one embodiment, the volumetric diffuser 40 engages an end of the second side wall 36. The light exit opening 72 may be angled such that the volumetric diffuser 40 is angled towards the base wall 32.

The volumetric diffuser 40 is arranged to be illuminated by the light 50, the reflected light 54, and the recycled light 56. The volumetric diffuser 40 may use a scattering medium to further scatter the light 50, the reflected light 54, and the recycled light 56 to provide a uniformly lit lighting device 10, as shown in FIG. 1B. Furthermore, the combination of the light sources (e.g. the light 50, the reflected light 54, and the recycled light 56) yields high efficiency, e.g. substantially all of the light exits through the light exit opening 72 of the lighting device 10.

The volumetric diffuser 40 extends along the elongated spline curve 22. The volumetric diffuser 40 is provided with a profile that is swept along the elongated spline curve 22 such that the profile lies normal to the elongated spline curve 22 at any point.

The volumetric diffuser 40 may be made from a volumetric diffuser material including the polymers listed above as optically transmissive polymers. The volumetric diffuser 40 may be made of a material that includes entrained gas bubbles or light reflecting particulates. The degree of diffusivity or diffusion provided by volumetric diffuser 40 is selectable, and may range from zero diffusivity (i.e. optically transparent materials) to a very high degree of diffusivity, including in one embodiment diffusivity of 50% or more of the incident light, and in another embodiment 75% or more of the incident light. As such, the volumetric diffuser 40 may be configured to transmit or emit incident light (0% diffusivity) or a diffuse light (for nonzero diffusivities).

The volumetric diffuser 40 faces towards and is spaced apart from an outer lens 76, as shown in FIGS. 4A and 4B. The outer lens 76 may be a transparent lens that extends over and is spaced apart from the elongated light guide 20, the reflector 30, the volumetric diffuser 40, and an elongated bezel 80.

As shown in FIGS. 1A, 1B, 4A, and 4B-9, the elongated bezel 80 is joined to or is operatively connected to the volumetric diffuser 40 and/or the reflector 30. In at least one embodiment, the elongated bezel 80 and the reflector 30 are formed as a single component.

Referring to FIGS. 4A, and 4B-9, the elongated bezel 80 includes a first bezel portion 82 and a second bezel portion 84 that extends from the first bezel portion 82. The volumetric diffuser 40 is operatively connected to at least one of the first bezel portion 82 and the second bezel portion 84.

Figure 7:
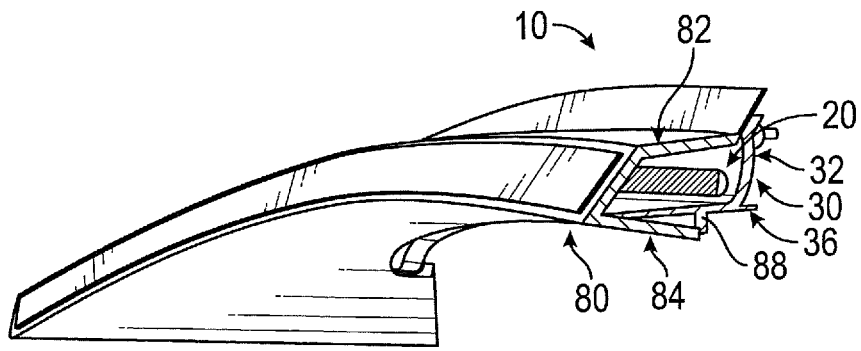
FIG. 7 is a perspective view of an embodiment of a light guide and housing comprising a bezel and reflector as disclosed herein.
Figure 8:
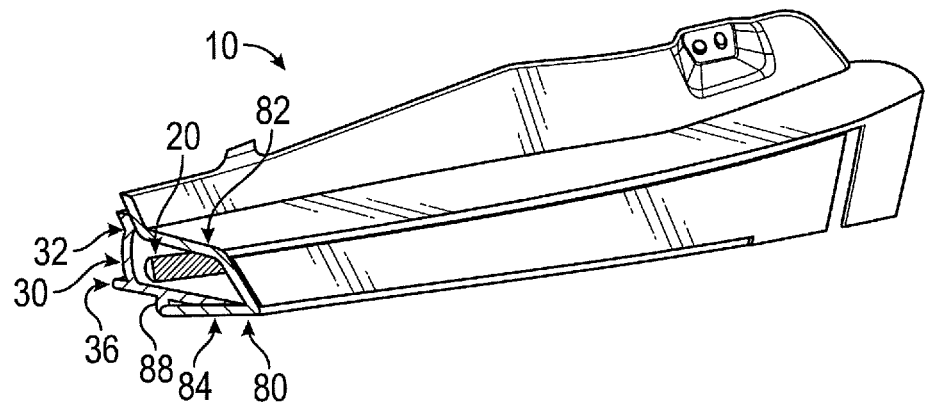
FIG. 8 is a perspective view of an embodiment of a light guide and housing comprising a bezel and reflector as disclosed herein.

The first bezel portion 82 extends over and is spaced apart from the first side wall 34, as shown in FIGS. 4A and 4B. The first bezel portion 82 is operatively connected to the volumetric diffuser 40, as shown in FIGS. 5-9. The first bezel portion 82 may define the first side wall 34 of the reflector 30, as shown in FIG. 5. In at least one embodiment, a member 86 extends about a portion of the first bezel portion 82. The first bezel portion 82 defines the first side wall 34 of the reflector 30 and may abut the base wall 32 and the first bezel portion 82, the base wall 32, and the second side wall 36 define the reflective channel 70, as shown in FIGS. 5, 7, and 8.

The first bezel portion 82 and the second bezel portion 84 are each directly connected to the volumetric diffuser 40, as shown in FIGS. 6, 8, and 9. The second bezel portion 84 may extend over and may be spaced apart from the second side wall 36, as shown in FIGS. 4A, 4B, and 5. The second bezel portion 84 may define the second side wall 36 of the reflector 30. The second bezel portion 84 engages an extension member 88 that extends from the second side wall 36, as shown in FIGS. 6-8. The extension member 88 defines a stop that is defined by a first surface 88a and a second surface 88b that extends from the first surface 88a. The member 86 may also extend about portions of the first bezel portion 82 and the second bezel portion 84.

The elongated bezel 80 having the volumetric diffuser 40 and at least a portion of the first side wall 34 and/or the second side wall 36 of the reflector 30, may be formed as or into a single component, such as by insert molding, co-molding, or two-shot injection molding. The elongated bezel 80 having the volumetric diffuser 40 and at least a portion of the first side wall 34 and/or the second side wall 36 of the reflector 30 may be formed as separate components and joined together by mechanical, physical, or chemical joining methods or means.

As shown in FIGS. 2 and 9, the light source 52 optically coupled to an end of the light guide 20. The light source 52 extends into the aperture of the mounting member 38 and is connected to the mounting member 38. The light source 52 and all other light sources referred to herein, may be any suitable light source, including an optical fiber, incandescent lamp, gas discharge (e.g. xenon) lamp, light emitting diode (LED), or the like. The light source 52 may be an LED light source having a plurality of LED's disposed adjacent to one another. The plurality of LED's may include any desired number of LED's, and more particularly 1-10 LED's, and even more particularly 1-5 LED's. The plurality of LED's may be configured to emit light of the same color or wavelength, or alternately may be configured to emit light of different colors or wavelengths.

The light source 52 or any of the light sources referred to herein, may be optically coupled to the light guide 20 by optical connectors or connecting joints, such as various mechanical joints or chemical joints, and including simply fixing the light source 52 in close proximity to the end of the light guide 20. This includes fixing the light source 52 into or within pockets, channels, recesses, or other featured formed into the mounting member 38 or an end of the light guide 20 such that the light guide 20 surrounds or encompasses the light source 52. It may also include the incorporation of an optically transparent glue or sealant that surrounds or encompasses the light source and end of the light guide.

The light source 52 includes an integrated circuit board 90, such as an LED board. The integrated circuit board 90 is operatively connected to the light source 52 and is operatively connected to the mounting member 38.

A first light source may be connected a first end of the light guide 20 and a second light source may be connected to a second end of the light guide 20. The light sources being connected on opposite ends of the light guide 20 enables the increase of the light intensity and/or light uniformity of the output light beam.

The lighting device 10 is arranged to provide the diffuse light beam with high efficiency and uniformity or homogeneity as illustrated in FIG. 1B wherein an embodiment of the lighting device 10 is illuminated to illustrate the lighting uniformity. In at least one embodiment, the light efficiency is at least 30%. In at least one embodiment, the uniform luminance distribution of less than 3:1 whether using a single element light guide, a plurality of light guides, or a light guide comprising a plurality of light guide portions or elements that are operatively connected to each other.

The lighting device 10 may have any desirable length and width, as described herein, including a width that varies along the length, as well as any desired shape. In the embodiment shown in FIG. 1, for example, the lighting device can provide a frame or surround for other vehicle lighting devices, such as a vehicle headlamp or tail lamp.

The components of the lighting device 10, including the light guide 20, the reflector 30, and the elongated bezel 80 may be formed by plastic injection molding in high volume, and in one embodiment may be molded by single shot injection molding in high volume. The lighting device 10 reduces the number of light sources (e.g. 1-4) required versus prior art designs that employ many single point source LEDs in a given device, thereby providing an advantageous cost when measured by lumens per dollar, for example.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the invention. Additionally, while various embodiments of the present disclosure have been described, it is to be understood that aspects of the present disclosure may include only some of the described embodiments or various combinations of the described embodiments. Accordingly, the present disclosure is not to be seen as limited by the foregoing description.

Having thus described the present disclosure, it is claimed:

1. A lighting device, comprising:
   an elongated light guide that extends along an elongated spline curve;
   a reflector at least partially disposed about the elongated light guide and extending along the elongated spline curve, the reflector having a reflective base wall, a reflective first side wall and a reflective second side wall each extending away from and attached to opposite ends of the base wall that together define a reflective channel, the reflective first side wall and the reflective second side wall defining a light exit opening opposite the base wall; and
   a volumetric diffuser disposed over the light exit opening and extends along the elongated spline curve, wherein the elongated light guide is disposed within the reflective channel between the sidewalls, the light guide is positioned closer to the base wall than the volumetric diffuser, and the volumetric diffuser is separate from the light guide body.

2. The lighting device of claim 1, wherein the reflector is arranged to redirect light that escapes the light guide to the volumetric diffuser.

3. The lighting device of claim 1, wherein the elongated light guide is suspended within the reflective channel by a connecting member, and wherein the elongated light guide is provided with the connecting member and is operatively connected to at least one of the base wall, the first side wall, and the second side wall.

4. The lighting device of claim 1, wherein elongated light guide includes an exit surface portion having a non-circular surface profile that faces towards the volumetric diffuser.

5. The lighting device of claim 4, wherein the elongated light guide includes a reflection portion that is disposed opposite the exit surface portion and faces towards the base wall.

6. The lighting device of claim 5, wherein the reflection portion of the light guide includes a plurality of prismatic optics.

7. The lighting device of claim 1, further comprising: an elongated bezel that is operatively connected to the volumetric diffuser.

8. The lighting device of claim 7, wherein the elongated bezel is spaced apart from the first side wall and the second side wall.

9. The lighting device of claim 7, wherein the elongated bezel includes a first bezel portion and a second bezel portion that extends from the first bezel portion.

10. The lighting device of claim 1, further comprising a light source optically coupled to an end of the light guide, wherein the light source comprises a plurality of LED's disposed adjacent to one another.

11. The lighting device set forth in claim 1, wherein the elongated light guide is disposed completely within the reflective channel.

12. A lighting device comprising:
an elongated light guide that extends along an elongated spline curve;
a reflector at least partially disposed about the elongated light guide and extending along the elongated spline curve, the reflector having a reflective base wall, a reflective first side wall and a reflective second side wall each extending away from and attached to opposite ends of the base wall that together define a reflective channel, the reflective first side wall and the reflective second side wall defining a light exit opening opposite the base wall; and
a volumetric diffuser disposed over the light exit opening and extends along the elongated spline curve, wherein the elongated light guide is suspended within the reflective channel by a connecting member, and wherein the connecting member is defined by at least one of the base wall, the first side wall, and the second side wall.

13. The lighting device of claim 12, wherein the connecting member is connected to the elongated light guide proximate a reflection portion of the elongated light guide.

14. A lighting device comprising:
an elongated light guide that extends along an elongated spline curve;
a reflector at least partially disposed about the elongated light guide and extending along the elongated spline curve, the reflector having a reflective base wall, a reflective first side wall and a reflective second side wall each extending away from opposite ends of the base wall that together define a reflective channel, the reflective first side wall and the reflective second side wall defining a light exit opening opposite the base wall;
a volumetric diffuser disposed over the light exit opening and extends along the elongated spline curve; and
an elongated bezel that is operatively connected to the volumetric diffuser, wherein the elongated bezel includes a first bezel portion and a second bezel portion that extends from the first bezel portion, and the first bezel portion defines the first side wall of the reflector.

15. The lighting device of claim 9, wherein the first bezel portion extends over and is spaced apart from the first side wall of the reflector.

16. The lighting device of claim 9, wherein the second bezel portion extends over and is spaced apart from the second side wall of the reflector.

17. The lighting device of claim 9, wherein the second bezel portion defines the second side wall of the reflector.

18. A lighting device comprising
an elongated light guide that extends along an elongated spline curve;
a reflector at least partially disposed about the elongated light guide and extending along the elongated spline curve, the reflector having a reflective base wall, a reflective first side wall and a reflective second side wall each extending away from and attached to opposite ends of the base wall that together define a reflective channel, the reflective first side wall and the reflective second side wall defining a light exit opening opposite the base wall;
a volumetric diffuser disposed over the light exit opening and extends along the elongated spline curve; and
a light source optically coupled to an end of the light guide, wherein the light source comprises a plurality of LED's disposed adjacent to one another, wherein an end of the reflector defines a mounting member that is arranged to retain an end of the elongated light guide.

19. The lighting device of claim 18, wherein the light source extends into an aperture of the mounting member.

* * * * *